United States Patent
Suzuki

(10) Patent No.: US 8,918,833 B2
(45) Date of Patent: Dec. 23, 2014

(54) DIGITAL BROADCAST RECEIVER

(75) Inventor: Hideki Suzuki, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1615 days.

(21) Appl. No.: 12/374,837

(22) PCT Filed: May 14, 2007

(86) PCT No.: PCT/JP2007/059872
§ 371 (c)(1),
(2), (4) Date: Jan. 23, 2009

(87) PCT Pub. No.: WO2008/012978
PCT Pub. Date: Jan. 31, 2008

(65) Prior Publication Data
US 2009/0322947 A1 Dec. 31, 2009

(30) Foreign Application Priority Data
Jul. 25, 2006 (JP) .................................. 2006-201387

(51) Int. Cl.
G06F 3/00 (2006.01)
G06F 13/00 (2006.01)
H04N 5/445 (2011.01)
H04N 7/16 (2011.01)
H04N 21/4782 (2011.01)
H04N 5/44 (2011.01)
H04N 21/41 (2011.01)
H04N 21/426 (2011.01)
H04N 21/434 (2011.01)
H04N 21/438 (2011.01)
H04N 21/4385 (2011.01)
H04N 21/442 (2011.01)
H04N 21/462 (2011.01)
H04N 21/472 (2011.01)

(52) U.S. Cl.
CPC ......... *H04N 21/4782* (2013.01); *H04N 5/4401* (2013.01); *H04N 21/4122* (2013.01); *H04N 21/426* (2013.01); *H04N 21/42615* (2013.01); *H04N 21/4345* (2013.01); *H04N 21/4382* (2013.01); *H04N 21/4385* (2013.01); *H04N 21/44231* (2013.01); *H04N 21/462* (2013.01); *H04N 21/4622* (2013.01); *H04N 21/47214* (2013.01)
USPC ............................................. 725/139; 725/38

(58) Field of Classification Search
None
See application file for complete search history.

(56) References Cited

U.S. PATENT DOCUMENTS 7,890,987 B2 * 2/2011 Freimann ...................... 725/100
8,074,252 B2 * 12/2011 Matsunaga .................... 725/132

(Continued)

FOREIGN PATENT DOCUMENTS

EP   1128663 A2   8/2001
JP   10-13756 A   1/1998

(Continued)

*Primary Examiner* — Mark D Featherstone
(74) *Attorney, Agent, or Firm* — Birch, Stewart, Kolasch & Birch, LLP

(57) ABSTRACT

A digital broadcast receiver A according to the present embodiment includes a tuner 1, a demodulation unit 3, a TS recorder 5, a decoding unit 7, a combination unit 11 and a display 15. It further includes a control unit 17 that performs the overall control, a ROM 20a that stores programs for performing various processing, a RAM 20b that reads and develops programs and performs high-speed processing, a remote control receiving unit 23 that receives signals from a remote controller, a BML browser 25, a HTML browser 27, a graphics plane 33, a switch unit 31 that performs switching to select the BML browser 25 or the HTML browser 27 to be connected to the graphics plane 33, and an application status monitoring memory unit 35 that monitors the status of applications. The application status monitoring memory unit 35 here monitors which application, the BML browser 25 or HTML browser 27, is active.

11 Claims, 6 Drawing Sheets

(56) References Cited

U.S. PATENT DOCUMENTS

| | | |
|---|---|---|
| 2002/0188943 A1 | 12/2002 | Freeman et al. |
| 2005/0102698 A1 | 5/2005 | Bumgardner et al. |
| 2005/0246706 A1 | 11/2005 | Uehara et al. |
| 2005/0271040 A1 | 12/2005 | Schmidt et al. |
| 2006/0031888 A1* | 2/2006 | Sparrell .................... 725/78 |

FOREIGN PATENT DOCUMENTS

| | | |
|---|---|---|
| JP | 2003-78890 A | 3/2003 |
| JP | 2005-65052 A | 3/2005 |
| JP | 2005-244716 A | 9/2005 |
| JP | 2005-250550 A | 9/2005 |
| JP | 2005-316761 A | 11/2005 |

* cited by examiner

DIGITAL BROADCAST RECEIVER

TECHNICAL FIELD

The present invention relates to a digital broadcast receiver, and specifically relates to a scheduled program display execution technique enabling channel selection for scheduled program display to be reliably executed.

BACKGROUND ART

In a digital broadcast receiver, video signals and audio signals for various kinds of programs can be provided on a display or television receiver, etc., connected to the digital broadcast receiver, based on video data and audio data sent from a broadcast station. Also, a digital broadcast receiver can display an EPG (Electronic Program Guide), which is what is called an electronic program listing, on a display or television receiver, etc., connected to the digital broadcast receiver, based on data (program sequence information) such as an EIT (Event Information Table) in which the contents such as channels on which programs are broadcasted, program start times and durations of the programs, are included, which are layered and sent together with video data and audio data (see patent document 1 identified below).

In order to monitor the EIT so as to follow, e.g., extension of the hour of baseball game broadcast, channel selection for scheduled program display, by which the channel for scheduled program display is selected, starts X seconds before the start of the program. This time length, X seconds, is determined so as to unfailingly obtain the EIT, taking the EIT transmission intervals into account. For example, in order to monitor the EIT so as to follow, e.g., extension of the hour of baseball game broadcast, channel selection for scheduled program display, by which the channel for scheduled program display is selected, is started X seconds before the start of the program. This time length, X seconds, is set to be the length of time enabling the EIT to be unfailingly obtained, taking the EIT transmission intervals into account.

FIG. 11 is a diagram illustrating an example of timing setting in common scheduled program display execution processing. As shown in FIG. 11, in common scheduled program display execution processing, the time for actually starting channel selection is set to the time X seconds before the actual target time for starting viewing. In other words, channel selection is started X seconds before, and from this point of time, EIT reception processing in which an attempt to receive an EIT is made is performed. An EIT obtained J seconds before, which is the time after the time X seconds before is evaluated, and if there is no change in the time for starting the program due to, e.g., extension of the hour of a program, screen display is provided, while if it is determined that there is a delay in the time for starting the program, the screen display waits until X seconds before a changed time.

Patent Document 1: JP Patent Publication (Kokai) No. 2005-65052 A

DISCLOSURE OF THE INVENTION

Problems to be Solved by the Invention

Currently, TVs are becoming more diverse from the perspective of their functions: for example, there is a trend toward providing an application for browsing the Internet in a TV. This type of application needs to use resources such as a graphics plane in such a manner in which the TV is excluded from use of such resources.

Also, in the current digital broadcasting, contents, such as data broadcasting, are transmitted, and many of the contents require automatic activation of a BML browser, which is an application fulfilling a television function, for channel selection to provide display. Accordingly, before channel selection for scheduled program display, it is necessary to release shared resources used by another application, which is an application other than the application fulfilling a television function, requiring time for terminating that other application. If this time is not taken into account, a problem arises in that the time from completion of channel selection to start of EIT obtainment is delayed, resulting in a failure in confirmation of a program start time.

An object of the present invention is to enhance the accuracy of recognizing a program start time. Another object of the present invention is efficient use of memory.

Means for Solving the Problems

In the present invention, when resources used for scheduled program display execution is used in a manner in which the other application is excluded from using such resources, the time for channel selection for the scheduled program display is set, taking the time for the other application to release the shared resources into account, so that a delay in channel selection for the scheduled program display can be avoided. For example,
(1) Taking the time Y for terminating an application into account, channel selection is started X+Y seconds before.
(2) Whether or not the application is active X+Y seconds before is determined, and if the shared resources are used by the application, channel selection for scheduled program display is performed X+Y seconds before, and if they are not used by the application, channel selection for scheduled program display is performed X seconds before. This prevents enlargement of the cut-off part in the last section of the preceding program, which results from advancement of channel selection for scheduled program display, in the case of successive scheduled program display.

In other words, an aspect of the present invention provides a digital broadcast receiver in which a plurality of applications including a first application and a second application can operate, characterized in that if either the first application or the second application can use a resource used for scheduled program display execution in such a manner that the other is excluded from using the resource, a time for channel selection for the scheduled program display is set, taking time required for processing for terminating the second application into account. Consequently, a delay in channel selection for scheduled program display due to release of the shared resources can be prevented.

Furthermore, it is preferable that whether or not a program is delayed is evaluated based on an EIT before a time for starting execution of processing based on the scheduled program display, and an execution start time is determined. It is preferable that as a result of the evaluation based on the EIT, if a program start time is not changed, display is started, and if the program start time is delayed, a changed time for channel selection for the scheduled program display is set, by which a time for channel selection for the scheduled program display is set the time for channel selection for the scheduled program display is re-set, taking the time for processing for terminating the active application into account.

Another aspect of the present invention provides a digital broadcast receiver including a function that evaluates whether or not a program is delayed based on an EIT before a time for starting execution of processing based on scheduled program display and determines an execution start time, in which a first application for fulfilling a TV function and a second application, which is an application other than an application for fulfilling a TV function, can operate, characterized by comprising: an application status monitoring memory unit that monitors an operation of an application; and a switch unit that performs switching to select a processing result for the first application or a processing result for the second application to be output so that an active application, which is determined as a result of monitoring by the application status monitoring memory unit, is assigned with a resource. The first application and the second application may be a BML browser and a HTML browser.

Control to start channel selection a length of time X+Y, which is calculated by adding time Y for terminating the second application, which is an application other than the first application fulfilling a TV function, to time X required for the monitoring based on the EIT, before the start of scheduled program display processing can be performed, taking the time Y into account.

Also, it is possible that: whether or not the second application, which is an application other than an application fulfilling a TV function, is active the length of time X+Y before is determined; and control is performed so that if a shared resource is used by the second application, which is an application other than an application fulfilling a TV function, channel selection is started, and if it is not used by the application, channel selection is started the length of time X before is performed. This is because excessive advancement of channel selection for scheduled program display may result in increasing cases in which the last part of the preceding program is cut off in at the time of channel selection for successive scheduled program display.

Still another aspect of the present invention provides a scheduled program display execution method using a digital broadcast receiver in which a first application and a second application can operate, characterized by comprising the steps of: starting channel selection a length of time X+Y, which is calculated by adding time Y for terminating the active application from the first application and the second application to time X required for monitoring based on an EIT, before start of scheduled program display processing, taking the time Y into account; and if it is determined from an evaluation based on the EIT a length of time J, which is required for EIT evaluation, before that a program start time is not changed, displaying a program for which display is scheduled, and if it is determined that the program start time is delayed, waiting until the time reaches a time X+Y before a changed time.

Also, a scheduled program display execution method using a digital broadcast receiver in which a first application for fulfilling a TV function and a second application, which is an application other than an application for fulfilling a TV function, can operate, characterized by comprising the step of: if the second application is active, detecting the operation of the application a length of time X+Y, which is calculated by adding time Y for terminating the second application to time X required for monitoring based on an EIT, before start of a scheduled program display, taking the time Y into account, and if the second application is not active, starting channel selection X seconds before, and if it is determined based on EIT evaluation at a length of time J, which is required for EIT evaluation, before that a program start time is not changed, displaying a program for which display is scheduled, and if it is determined that the program start time is delayed, waiting until the time reaches a time X+Y before a changed time is provided.

The present invention may be a program for making a computer execute the above-described steps.

Advantages of the Invention

Use of a digital broadcast receiver according to the present invention provides the following advantages.

1) A program start time can reliably be confirmed.
2) Memory can effectively be used.
3) In the case of channel selection for successive scheduled program display, the cut-off part in the last section of the preceding scheduled program can be reduced.

DESCRIPTION OF SYMBOLS

A . . . digital broadcast receiver, 1 . . . tuner, 3 . . . demodulating unit, 5 . . . TS recorder, 7 . . . decoding unit, 11 . . . combination unit, 15 . . . display, 17 . . . control unit, 20a . . . ROM, 20b . . . RAM, 23 . . . remoter control receiving unit, 25 . . . BML browser, 27 . . . HTML browser, 31 . . . switch unit, 33 . . . graphics plane, 35 . . . application status monitoring memory unit,

BEST MODE FOR CARRYING OUT THE INVENTION

Figure 1:
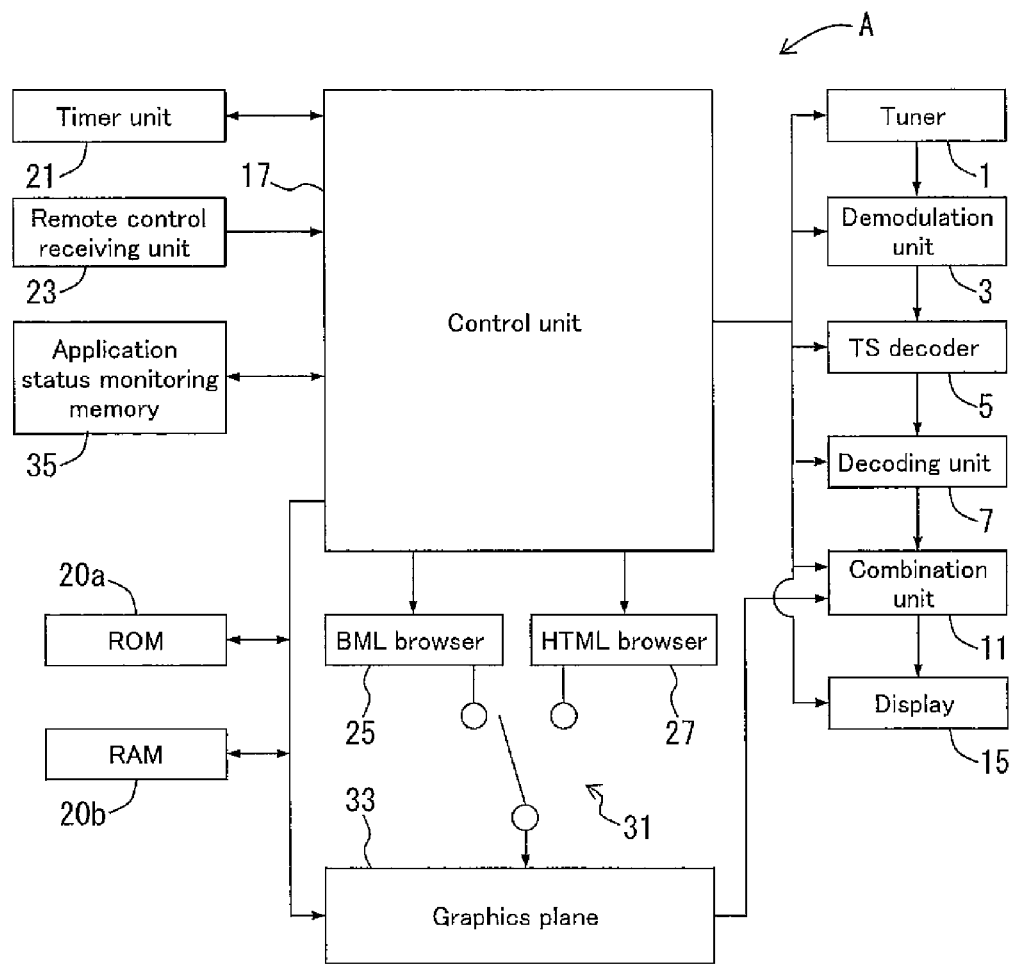
FIG. 1 is a function block diagram illustrating an example configuration of a digital broadcast receiver according to a first embodiment of the present invention.
Figure 2:
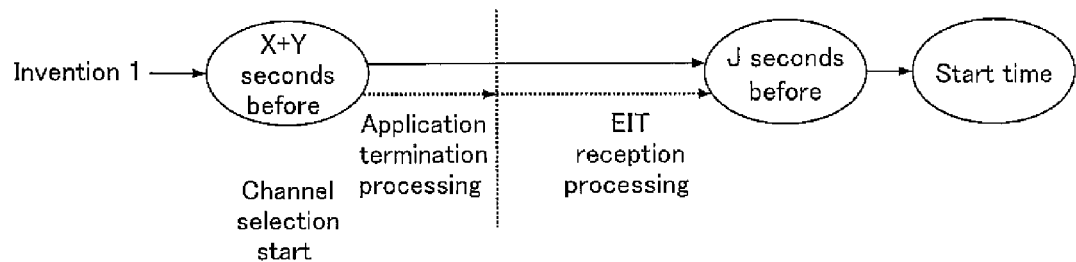
FIG. 2 is a diagram illustrating an overview of scheduled program display execution processing according to the present embodiment, which is a diagram shown in such a manner that it can be compared with FIG. 11.

Hereinafter, a digital broadcast receiver according to a first embodiment of the present invention will be described with reference to the drawings. FIG. 1 is a function block diagram illustrating an example configuration of the digital broadcast receiver according to the present embodiment. FIG. 2 is a schematic diagram for clarifying the difference between scheduled program display execution processing according to the present invention and common scheduled program display execution processing, which is a diagram shown in such a manner that it can be compared with FIG. 11.

As shown in FIG. 1, the digital broadcast receiver A according to the present embodiment includes a tuner 1, a demodulation unit 3, a TS recorder 5, a decoding unit 7, a combination unit 11 and a display 15. It further includes a control unit 17 that performs the overall control, a ROM 20a that stores programs for performing various processing, a RAM 20b that reads and develops programs and performs high-speed processing, a remote control receiving unit 23 that receives signals from a remote controller, a BML browser 25, a HTML browser 27, a graphics plane 33, which is an area for drawing characters and figures, etc., provided by the BML browser 25 and the HTML browser 27, a switch unit 31 that performs switching to select the BML browser 25 or the HTML browser 27 to be connected to the graphics plane 33, and an application status monitoring memory unit 35 that monitors the status of applications. The application status monitoring memory unit 35 here monitors which application, the BML browser 25 or HTML browser 27, is active.

Figure 11:
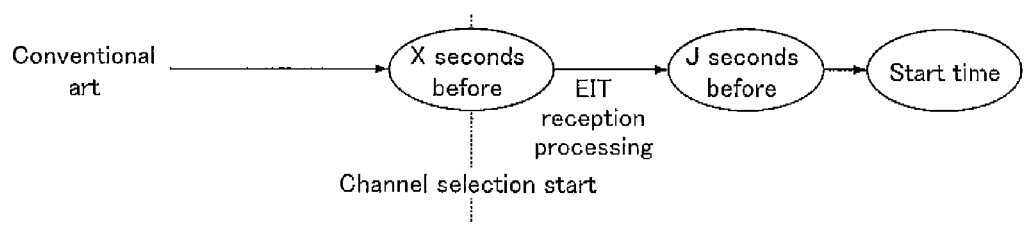
FIG. 11 is a diagram illustrating an example of timing setting in common scheduled program display execution processing.

As opposed to the common scheduled program display execution processing described with reference to FIG. 11, in the present embodiment, as shown in FIG. 2, since the resources, such as the graphics plane, which had been occupied by the BML browser fulfilling a TV function, may be used by an application other than an application fulfilling a TV function, channel selection is started X+Y seconds before the scheduled program display start time, taking time Y required for the application other than the application fulfilling a TV function to release the resources into account. Then, an EIT is evaluated J seconds before. Here, as a result of evaluation of the EIT, if the program start time is not changed, display is provided. If it has turned out that the program start time is delayed, the display waits until the time reaches the time X+Y seconds before the changed time.

Figure 3:
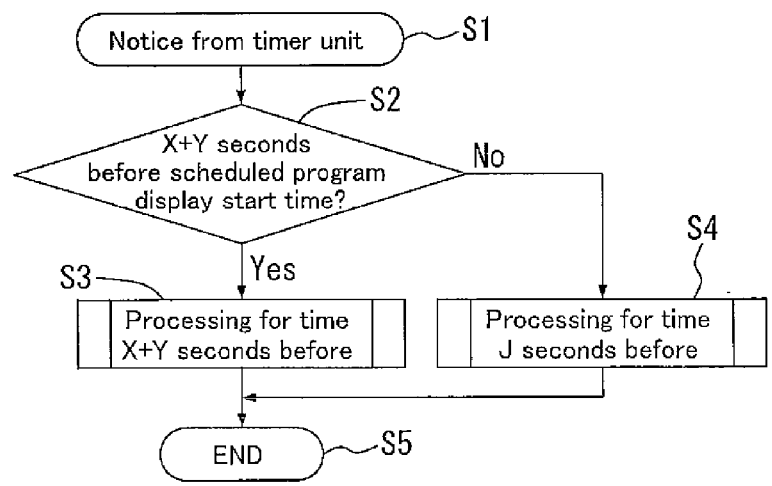
FIG. 3 is a flowchart illustrating the overall flow of processing for scheduled program display according to the present embodiment.

FIG. 3 is a flowchart illustrating the overall flow of processing for scheduled program display according to the present embodiment. Here, the time X+Y seconds before is set in the timer unit 21 (FIG. 1) at the stage of a user scheduling display of a program. As shown in FIG. 3, at step S1, the control unit receives a notice to the effect that the time has reached the set time, from the timer unit, and at step S2, determines whether or not the time is the time X+Y seconds before the scheduled program display start time. If it is the time X+Y seconds before (Yes), the processing proceeds to step S3, processing for the time X+Y seconds before is performed, and if it is the time J seconds before (No), the processing proceeds to step S4, processing for the time J seconds before is performed. The processing proceeds to step S5, and the processing for scheduled program display is terminated.

Figure 4:
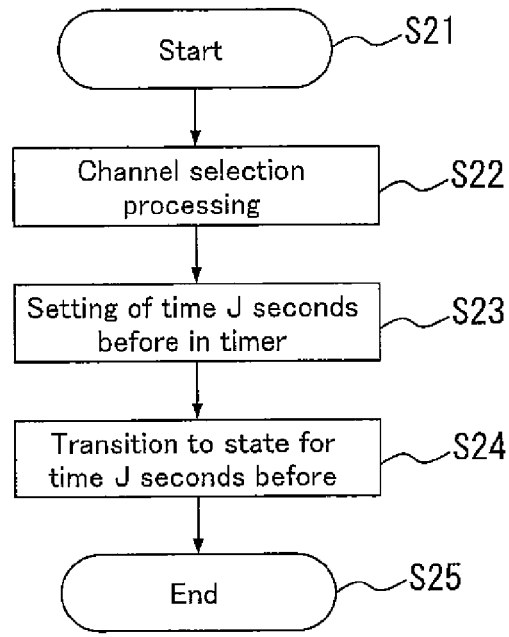
FIG. 4 is a flowchart illustrating the content of processing for the time X+Y seconds before in FIG. 3.

FIG. 4 is a flowchart illustrating the content of the processing for the time X+Y seconds before in FIG. 3. At step S21, the processing is started, and at step S22, channel selection processing is performed X+Y seconds before. At step S23, the time J seconds before is set in the timer, at step S24, when the time has reached the time J seconds before, the status is made to transit to the state for the time J seconds before, and the processing for the time X+Y seconds before is terminated (step S25).

Figure 5:
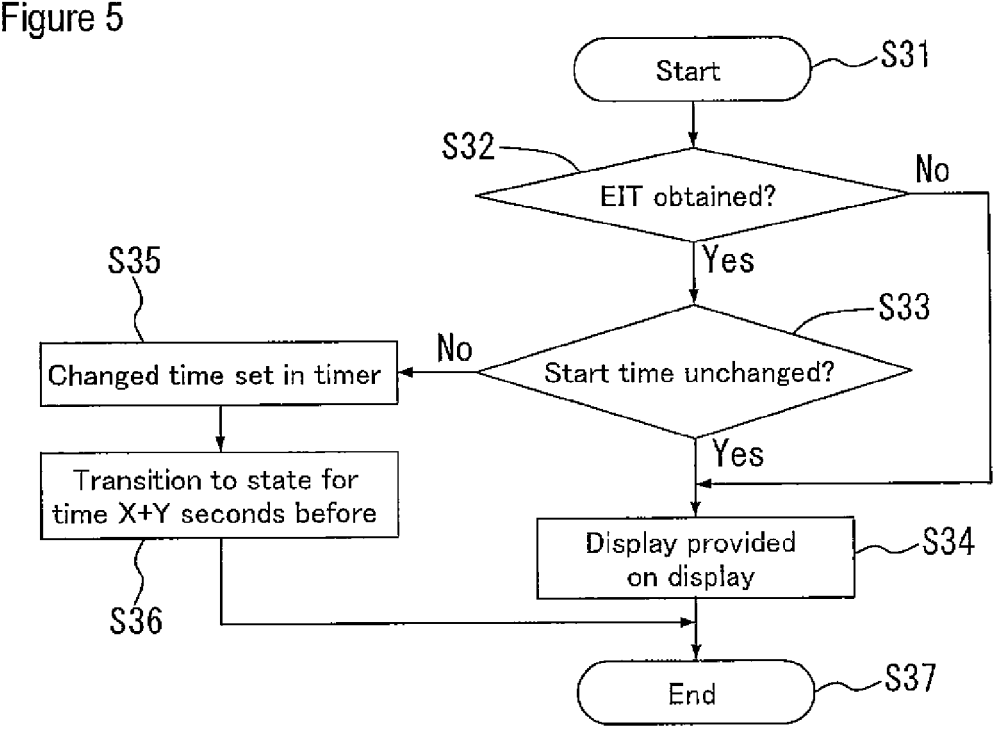
FIG. 5 is a flowchart illustrating the content of processing for the time J seconds before in FIG. 3.

FIG. 5 is a flowchart illustrating the content of the processing for the time J seconds before in FIG. 3. First, at step S31, the processing is started, whether or not an EIT have been obtained as a result of channel selection is determined at step S32, and if it has been obtained (Yes), whether or not the program start time is unchanged (whether or not the program start time is undelayed) is determined at step S33. If the program start time is changed (No), the processing proceeds to step S35, and if it is unchanged (Yes), the processing proceeds to step S34. Also, if the EIT could not be obtained at step S32 (No), the processing proceeds to step S34.

At step S34, the display is provided on the display so that the program can be viewed, and the processing for the time J seconds before is terminated (step S37). At step S35, the timer setting is changed to the time X+Y seconds before, and the processing proceeds to step S36, and the status is made to transit to the state for the time X+Y seconds before, waiting for a notice in step S1 in FIG. 3.

As described above, according to scheduled program display execution processing according to the present embodiment, channel selection is started at a time Y seconds earlier than the time X seconds before that enables unfailing obtainment of an EIT in consideration of the EIT transmission intervals, taking the time Y for terminating the application other than the application fulfilling a TV function into account, that is, X+Y seconds before, providing an advantage in that the program start time can reliably be confirmed. However, if channel selection is performed at the time earlier than the time Y seconds before, that is, channel selection is excessively advanced, for example, when temporally-sequential scheduled program display, that is, successive scheduled program display is provided, the last part of the preceding program may be cut off, and therefore, it is preferable that channel selection is started just at the time X+Y seconds before.

Figure 6:
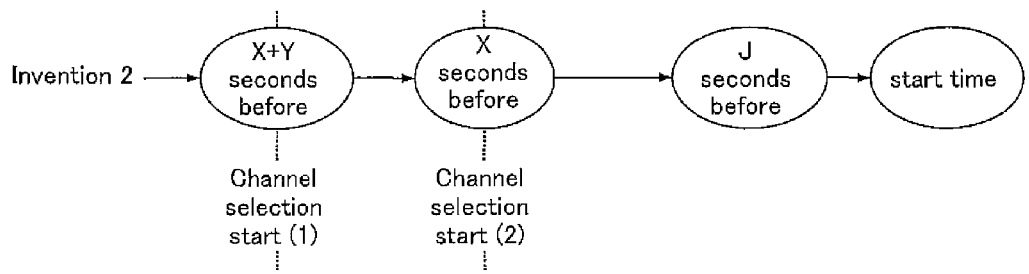
FIG. 6 is a diagram illustrating an overview of scheduled program display execution processing according to a second embodiment of the present invention, which is a diagram shown in such a manner that it can be compared with FIGS. 2 and 11.

Next, processing for scheduled program display according to a second embodiment will be described with reference to the drawings. FIG. 6 is a diagram illustrating an overview of scheduled program display execution processing according to the present embodiment, which is shown in such a manner that it can be compared with FIGS. 2 and 11. In the present embodiment, whether or not an application other than an application fulfilling a TV function is active is determined X+Y seconds before a display start time, if the shared resources are used by the application other than an application fulfilling a TV function, channel selection is started X+Y seconds before (channel selection start 1), and if the resources are not used by the application other than an application fulfilling a TV function, channel selection for scheduled program display is performed X seconds before (channel selection start 2). Then, an EIT is evaluated J seconds before.

Figure 7:
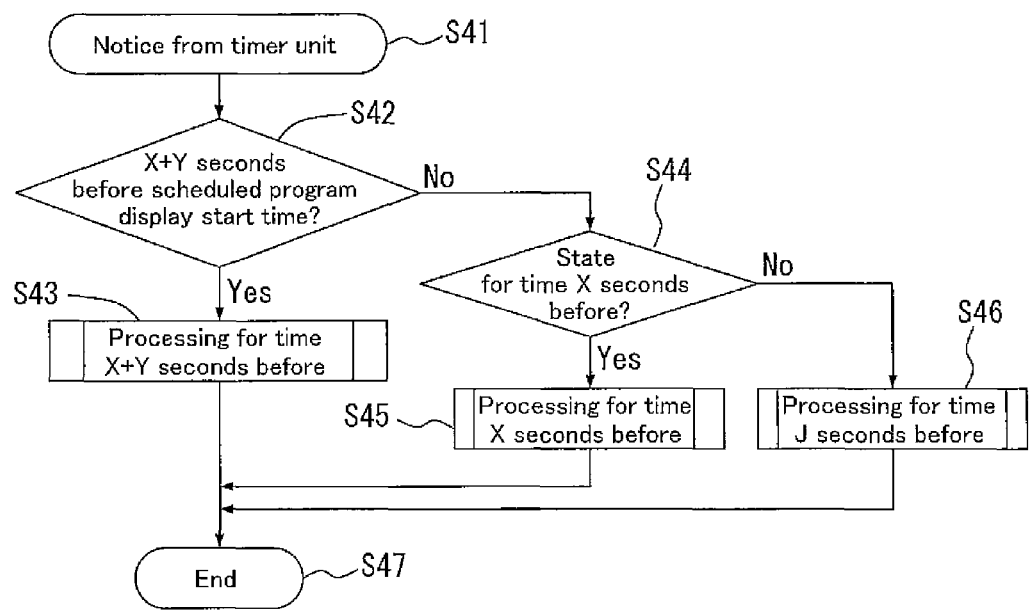
FIG. 7 is a flowchart illustrating the overall flow of processing for scheduled program display according to the present embodiment.

FIG. 7 is a flowchart illustrating the overall flow of processing for scheduled program display according to the present embodiment. Here, the time X+Y before is set in the timer unit 21 (FIG. 1) at the stage of a user scheduling display of a program. As shown in FIG. 7, at step S41, the control unit receives a notice to the effect that the time has reached the set time, from the timer unit, and at step S42, determines whether or not the time is the time X+Y seconds before the scheduled program display start time. If it is the time X+Y seconds before (Yes), the processing proceeds to step S43, processing for the time X+Y seconds before is performed, and if it is not the time X+Y seconds before (No), the processing proceeds to step S44, whether or not the status is in the state for the time X seconds before is determined. If it is determined at step S44 that the status is in the state for the time X seconds before (Yes), the processing proceeds to step S45, and the processing for the time X seconds before is performed. If it is determined at step S44 that the status is not in the state for the time X seconds before (No), the processing proceeds to step S46, and processing for the time J seconds before is performed. The processing proceeds to step S47, and the processing for scheduled program display processing is terminated.

Figure 8:
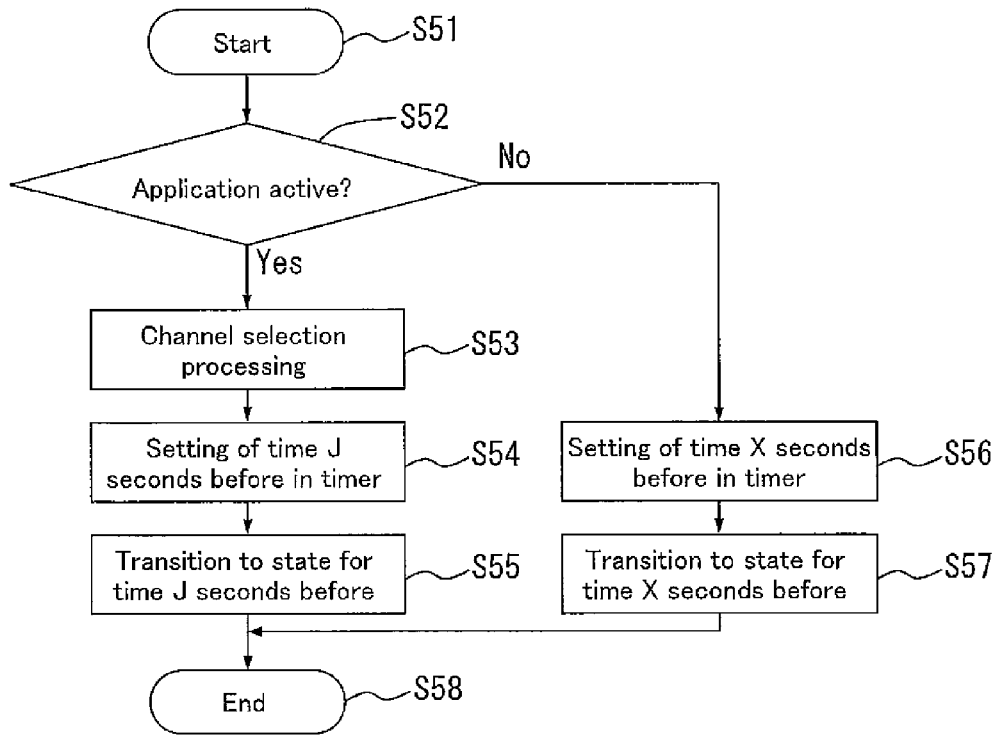
FIG. 8 is a diagram illustrating the details of processing for the time X+Y seconds before at step S43.

FIG. 8 is a diagram illustrating the details of the processing for the time X+Y seconds before at step S43. First, at step S51, the processing is started, and whether or not the application other than an application fulfilling a TV function is active is determined at step S52. If the application other than an application fulfilling a TV function is active (Yes), the processing proceeds to step S53, and if the application other than an application fulfilling a TV function is not active (No), the processing proceeds to step S56. If the processing proceeds to step S53, channel selection processing (channel selection start 1 in FIG. 6) is performed, and at step S54, the time J seconds before is set in the timer, and at step S55, the status is made to transit to the state for processing for the time J seconds before, and the processing for the time X+Y seconds before is terminated (step S58). If the processing proceeds to step S56, the time X seconds before is set in the timer, and at step S57, the status is made to transit to the state for processing for the time X seconds before, and the processing for the time X+Y seconds before is terminated (step S58).

Figure 9:
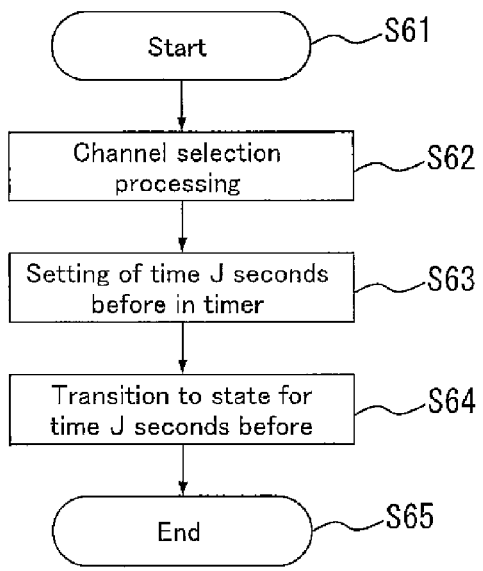
FIG. 9 is a flowchart illustrating the details of processing for the time X seconds before at step S57.
Figure 10:
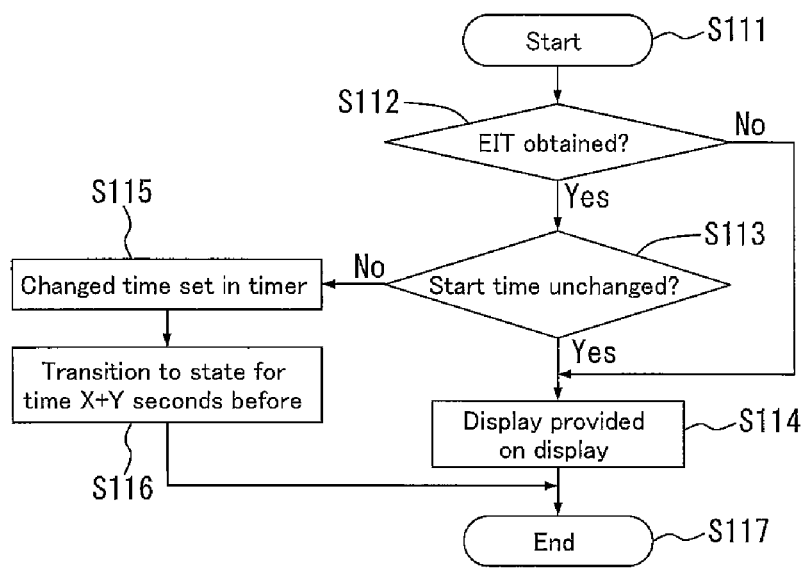
FIG. 10 is a diagram illustrating the details of processing for the time J seconds before.

FIG. 9 is a flowchart illustrating the details of the processing for the time X seconds before at step 57, which is described above. First, when the processing for the time X seconds before is started at step S61, channel selection processing is performed at step S62 (channel selection start 2 in FIG. 6), and the time J seconds before is set in the timer at step S63, and the status is made to transit to the state for processing for the time J seconds before at step S64, and the processing for the time X seconds before is terminated (step S65). FIG. 10 is a diagram illustrating the details of the processing for the time J seconds before, and as with the processing shown in FIG. 5, based on whether or not an EIT has been obtained (step S112) and whether or not the start time is changed (step S113), display is provided on the display (S114) or the status is made to transit to the state for the processing for the time X+Y seconds before (step S116).

As described above, according to scheduled program display execution processing according to the present embodiment, whether or not the application other than an application fulfilling a TV function is active is determined X+Y seconds before, and if the shared resources are used by the application, channel selection for scheduled program display is performed X+Y seconds before, and if they are not used by the application, channel selection for scheduled program display is performed X seconds before. When channel selection for scheduled program display is advanced, the cut-off part in the last section of the preceding program will be increased in the case of successive scheduled program display. However, the above-described determination of whether or not the application other than an application fulfilling a TV function is active X+Y seconds before provides an advantage that even successive scheduled program display can be handled sensitively. Furthermore, the accuracy of recognizing the program start time can be enhanced. In the case of successive scheduled program display, the cut-off part of the preceding program can be reduced.

Although the embodiments of the present invention have been described in details in terms of the case where a BML browser is used as an application fulfilling a TV function and an HTML browser is used as an application other than an application fulfilling a TV function, it should be understood that an application other than an HTML browser may be the application other than an application fulfilling a TV function.

Also, examples of the digital broadcast receiver according to the present invention may include TV receivers, recording and reproduction devices, personal computers and mobile phones. More specifically, mobile terminals such as mobile phones provide a particular advantage because they have a relatively-small memory capacity as a result of downsizing.

INDUSTRIAL APPLICABILITY

The present invention can be used for a digital broadcast receiver.

The invention claimed is:

1. A digital broadcast receiver in which a plurality of applications, including a first application and a second application, are configured to operate, the receiver comprising:
a controller configured to set a time for channel selection for a scheduled program display, wherein if either the first application or the second application can use a resource used for the scheduled program display execution in such a manner that the other is excluded from using the resource, the time for channel selection includes a time required for processing with respect to terminating an active application from among the first application and the second application,
wherein the controller is configured to
evaluate, before a time for starting execution of processing based on the scheduled program display, whether or not a program is delayed is based on an event information table (EIT)
determine an execution start time; and
reset the time for channel selection for the scheduled program responsive to a delayed program start time as a result of an evaluation based on the EIT, wherein resetting the time takes processing time for terminating the active application into account.

2. The digital broadcast receiver according to claim 1, wherein the controller is configured to start display responsive to an unchanged program start time as a result of an evaluation based on an event information table (EIT).

3. A digital broadcast receiver configured to evaluate whether or not a program is delayed based on an event information table (EIT) before a time for starting execution of processing based on a scheduled program display and to determine an execution start time, in which a first application for fulfilling a TV function and a second application, which is an application other than an application for fulfilling a TV function, are configured to operate, the digital broadcast receiver comprising:
an application status monitoring memory unit configured to monitor an operation of an application;
a switch unit configured to perform switching to select a processing result for the first application or a processing result for the second application to be output so that an active application, which is determined as a result of monitoring by the application status monitoring memory unit, is assigned with a resource; and
a controller is configured to start channel selection, responsive to the active application being the second application, a length of time of two timers before the start of scheduled program display processing is performed.

4. The digital broadcast receiver according to claim 1, wherein as a result of the evaluation based on the EIT, if a program start time is not changed, display is started, and if the program start time is delayed, the time for channel selection for the scheduled program display is re-set, taking the time for processing for terminating the active application into account.

5. The digital broadcast receiver according to claim 3, wherein the first application and the second application are a broadcast markup language (BML) browser and an HTML browser.

6. The digital broadcast receiver according to claim 5, wherein the controller is configured to start channel selection a length of time X+Y before the start of scheduled program display processing is performed, responsive to the active application being the second application, wherein Y is a time for terminating the second application and X is a time required for the monitoring based on the EIT.

7. The digital broadcast receiver according to claim 5, wherein a controller is configured to:
   determine whether or not an application is active the length of time X+Y before the scheduled program display;
   select a channel at time X+Y before the scheduled program display responsive to a shared resource being used by the application; and
   select a channel a length of time X before the scheduled program display responsive to if the shared resource is not used by the application.

8. A scheduled program display execution method using a digital broadcast receiver in which a first application and a second application are configured to operate, the method comprising:
   starting channel selection a length of time X+Y, which is calculated by adding time Y for terminating the active application from the first application and the second application to time X required for monitoring based on an EIT, before start of scheduled program display processing, taking the time Y into account; and
   displaying a program for which display is scheduled responsive to a determination from an evaluation based on the EIT a length of time J, which is required for EIT evaluation, before the start of scheduled program display processing that a program start time is not changed, and
   waiting until the time reaches a time X+Y before a changed time responsive to a determination that the program start time is delayed.

9. A non-transitory tangible computer-readable medium having computer-executable instructions embodied thereon that, when executed, perform a scheduled program display execution method using a digital broadcast receiver in which a first application and a second application are configured to operate, the method comprising the method of claim 8.

10. A scheduled program display execution method using a digital broadcast receiver in which a first application for fulfilling a TV function and a second application, which is an application other than an application for fulfilling a TV function, are configured to operate the method comprising:
   detecting the operation of the application a length of time X+Y, which is calculated by adding time Y for terminating the second application to time X required for monitoring based on an EIT, before start of a scheduled program display, taking the time Y into account responsive to the second application being active, and
   starting channel selection X seconds before responsive to the second application not being active, and if it is determined based on EIT evaluation at a length of time J, which is required for EIT evaluation, before that a program start time is not changed, displaying a program for which display is scheduled, and if it is determined that the program start time is delayed, waiting until the time reaches a time X+Y before a changed time.

11. A non-transitory tangible computer-readable medium having computer-executable instructions embodied thereon that, when executed, perform a scheduled program display execution method using a digital broadcast receiver in which a first application for fulfilling a TV function and a second application, which is an application other than an application for fulfilling a TV function, are configured to operate, the method comprising the method of claim 10.

* * * * *